United States Patent [19]

Check, III et al.

[11] Patent Number: 5,516,463
[45] Date of Patent: May 14, 1996

[54] METHOD OF MAKING LIGHT-POLARIZING PARTICLES

[75] Inventors: Joseph A. Check, III, West Bayshore; Steven M. Slovak, North Massapequa; Robert I. Thompson, Plainview, all of N.Y.

[73] Assignee: Research Frontiers Incorporated, Woodbury, N.Y.

[21] Appl. No.: 268,412

[22] Filed: Jul. 8, 1994

Related U.S. Application Data

[63] Continuation-in-part of Ser. No. 95,746, Jul. 21, 1993, abandoned.

[51] Int. Cl.⁶ ........................................... F21V 9/14
[52] U.S. Cl. ................................ 252/585; 359/296
[58] Field of Search ...................... 252/582, 585; 359/296

[56] References Cited

U.S. PATENT DOCUMENTS

| | | | |
|---|---|---|---|
| 2,289,712 | 7/1939 | Land | 252/585 |
| 4,270,841 | 6/1981 | Saxe | 359/296 |
| 4,407,565 | 10/1983 | Saxe | 252/585 |
| 4,877,313 | 10/1989 | Saxe et al. | 252/585 |
| 4,895,677 | 1/1990 | Okumura | 252/585 |
| 5,002,701 | 3/1991 | Saxe | 252/585 |
| 5,130,057 | 7/1992 | Saxe | 252/585 |

*Primary Examiner*—Philip Tucker
*Attorney, Agent, or Firm*—Graham & James

[57] ABSTRACT

A method of making crystals of a light-polarizing material useful in a liquid light valve suspension with the addition of controlled amounts of water relative to the amount of reactants used in making the particles of the light-polarizing material.

5 Claims, No Drawings

METHOD OF MAKING LIGHT-POLARIZING PARTICLES

This is a continuation-in-part of our application Ser. No. 08/095,746 filed Jul. 21, 1993, now abandoned which is incorporated herein by reference thereto.

FIELD OF THE INVENTION

The present invention relates to light valves, and more particularly to improvements in making particles useful in a light valve suspension used to control light transmission in a light valve.

BACKGROUND OF THE INVENTION

U.S. Pat. Nos. 4,877,313 and 5,002,701 describe light valves, particles useful in a light valve suspension and light valve suspensions, and are incorporated herein by reference thereto. In these patents, a light polarizing material containing adsorbed iodine, is described as being comprised of a complex obtained by reacting (i) elemental molecular iodine, (ii) a hydrohalide acid and/or an ammonium or alkali metal or alkaline earth metal halide, and (iii) a precursor compound. The reaction may take place in the presence of a protective colloid, such as nitrocellulose. These particles are suspended in a liquid suspending medium to form a light valve suspension.

It is particularly useful that the particle size of the particles suspended in the light valve suspension are not too large (generally on the order of about 1 micron or less) in order to maintain the particles in a suspension without agglomeration or precipitation during repeated on-off cycles of the light valve. Obtaining particles of appropriate colloidal size, however, has been generally unpredictable and has been believed to be a function of the specific combination and character of the reaction materials used to form the particles and various crystallization conditions and parameters. Breaking up of large particles may affect the ability of the particles to function as light valve particles. It would therefore be desirable to initially form the particles in the appropriate size dimensions.

It is accordingly an object of the present invention to provide crystals of a light polarizing material of a size suitable for use in a light valve suspension.

It is a further object of the present invention to provide means for forming the suitable size of particles of light polarizing crystals as the particles of the light polarizing material are initially formed.

These and other objects, features and advantages of the present invention will become more evident from the following discussion.

SUMMARY OF THE INVENTION

The present invention provides a light polarizing material containing adsorbed iodine, comprising a complex obtained by reacting (i) elemental molecular iodine, (ii) a hydrohalide acid and/or an ammonium or alkali metal or alkaline earth metal halide, and (iii) a precursor compound, in the presence of a solution of a polymeric stabilizer in a non-aqueous solvent in which the precursor compound and the light-polarizing material are at least substantially insoluble, and in the presence of an amount of water effective to cause the formation of the particles of the light-polarizing material but less than an amount which results in the formation of particles of the light polarizing material having an average particle length in excess of 1 micron.

Generally the present invention comprises controlling the particle size of the crystals of a light polarizing material formed from the reaction mixture described above, to provide substantially only particles of a sufficiently small particle size, suitable for being maintained in a colloidal suspension in a light valve suspension. In accordance with the present invention, it has been discovered that the control of the particle size of the crystals may be effected by rigorously controlling the relative amount of water in the reaction medium used to form the crystals of light polarizing material. It has been found that excessive amounts of water in the reaction medium will result in large crystals that are not of optimum size for use as a light valve material, whereas when the crystals are formed in the complete absence of water, the requisite reaction to form the light valve particles does not occur.

In accordance with the present invention, the range of the amount of water to be used, by weight, based on the combined weight of the reactants (i), (ii) and (iii), preferably ranges from a trace amount to a maximum, at which particle sizes become too large, of about 20%. In any case, the desired amount of water to be included in the reaction medium is readily determined empirically. Thus, generally, suitable average particle sizes for the light valve particles range from about 0.2 microns to about 1 micron in length, with larger amounts of water resulting in larger particles. It has been discovered that there is a correlation between the decay time of a light valve suspension containing a suspension of the particles in a light valve suspending medium and the particle size of the particles in the light valve suspension. A test for particular particle sizes can be thereby effected by a measurement of decay time. The maximum amount of water is correlated to an obtained decay time of about 50 milliseconds, which has been discovered as being indicative of the 1 micron length size particles, using the Decay Time Test defined as follows.

A suspension of the formed particles in a light valve suspending medium is filled into a light valve cell comprising glass sheets carrying suitable electrodes, spaced 5 mil apart. The light valve suspension is illuminated with continuous illumination such as from a tungsten lamp. The suspension of particles in the light valve is energized by applying to the electrodes about 55 volts at 10 kHz to a baseline measurement. About 2–3 milliseconds are required to reach an open state of the light valve, and approximately 20 milliseconds thereafter the electrical field is discontinued. Decay to the fully closed state of the light valve is measured thereafter. A decay time of about 6 milliseconds ("ms") correlates to a particle size of up to about 0.2 microns, a decay time of 20 ms correlates to an average particle size of about 0.7 microns and a decay time of about 50 ms correlates to an average particle length of about 1 micron and higher. Decay time is related to particle size wherein the larger the particle, the longer the time of decay, with a shorter decay time being preferred. Decay times in excess of 50 milliseconds are indicative of usually unsuitable particles that may be highly susceptible to agglomeration and precipitation. The maximum percentage of water content should therefore, depending on the precursor compound, be preferably less than that which provides crystals, or particles, having decay times of 50 milliseconds or higher. As stated above, generally, the maximum amount of water is from about 20% by weight based on the weight of the reactants (i), (ii) and (iii).

In accordance with the method of the present invention, (i) elemental molecular iodine, (ii) a hydrohalide acid and/or an ammonium or alkali metal or alkaline earth metal halide, and (iii) the precursor compound are reacted in the presence of a solution of a polymeric stabilizer in a non-aqueous solvent in which the precursor compound and the light-polarizing material are at least substantially insoluble, and in the presence of the controlled amount of water. When the reaction mixture is formed, the precursor compound will settle to the bottom of the reaction vessel, since the precursor compound is at least substantially insoluble in the non-aqueous solvent. Although the reaction will proceed merely upon bringing the reactants into contact with one another, it is preferred to agitate the reaction mixture, such as by ultrasonic agitation, to increase the speed of the reaction.

The reaction to form the particles of light-polarizing material readily occurs at room temperature and, with suitable agitation of the reaction mixture, is generally complete within several hours. Since the particles of the light-polarizing material are insoluble in the non-aqueous solvent, the particles are easily separated from the solvent by filtration, centrifugation or the like. Any residual non-aqueous solvent may be removed by evaporation.

The precursor compound (iii) is a metal ion-chelating heterocyclic compound that will give rise to light-polarizing crystals when reacted with elemental iodine (i) and the halide (ii) reactants. The precursor compound contains a nitrogen atom in the heterocyclic ring and also includes a chelating group. Suitably, the nitrogen-containing heterocyclic ring contains from about 4 to about 10 ring members and may contain up to about 3 additional heteroatoms selected from nitrogen, oxygen and/or sulfur. The metal ion-chelating heterocyclic compound may also contain more than one fused heterocyclic ring, such as from 1 to about 4 fused heterocyclic rings each containing from about 4 to about 10 ring atoms, or it may contain a fused carbocyclic ring of from about 4 to 8 ring members. Any fused heterocyclic ring may suitably contain up to 4 heteroatoms, selected from oxygen, nitrogen and/or sulfur.

For example, the metal ion-chelating heterocyclic compound may contain a saturated or unsaturated heterocyclic ring including one or more chelating groups, —N(H)—C(CO)—, as part of the ring atoms of the heterocyclic ring. The metal ion-chelating heterocyclic ring may also contain a six-membered aromatic (fully unsaturated) heterocyclic ring containing one or more chelating groups, —N=C(COOH)—, as part of the ring atoms of the heterocyclic ring.

Compounds I–V that are useful in forming the light polarizing materials of the invention include:

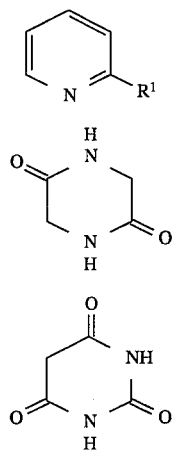

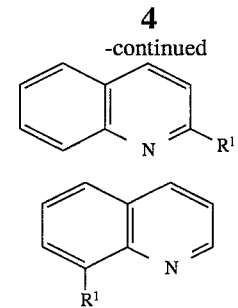

wherein $R^1$ is carboxy, hydroxy, 2-pyridyl or lower alkyl substituted by carboxy or hydroxy; and $R^2$ is carboxy, hydroxy or lower alkyl substituted by carboxy or hydroxy.

It is also preferred that lower alkyl is of 1 to 4 carbon atoms.

Compounds I–V are known per se or may be isomers, homologues or analogs or known compounds and may be prepared analogously to such known compounds.

Compounds I and IV that contain a 2-pyridyl group may be formed analogously to the formation of 2,2'-dipyridyl.

Compounds VI and VII are also useful informing the light-polarizing materials of the invention.

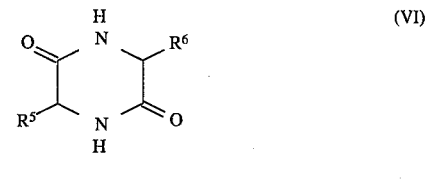

or

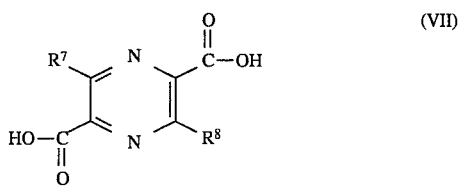

wherein $R^5$, $R^6$, $R^7$, $R^8$, are independently hydrogen or lower alkyl, provided that at least one of $R_5$ and $R_6$ is lower alkyl.

When $R^5$, $R^6$, $R^7$ and $R^8$ are lower alkyl, the lower alkyl may be straight or branched chain alkyl, such as methyl, ethyl, propyl, isopropyl, butyl, isobutyl, t-butyl and the like. Usually, the lower alkyl will have from 1 to about 6 carbon atoms, In general, the solubility of compound VI or VII in organic solvents increases and the solubility in water decreases as the number of carbon atoms of the lower alkyl substituents increases. Hence, the desired balance of organic solvent/water solubility may be obtained by appropriate selection of the lower alkyl groups.

Compounds VI and VII are known per se or may be isomers, homologues or analogs of known compounds and may be prepared analogously to such known compounds.

Useful precursor compounds include, in particular:
Glycine anhydride (2,5-piperazinedione)
5,6-Dihydrouracil
Urazole
Succinimide
Glycoluril (acetyleneurea)
Hydantoin
Alanine anhydride (3,6-dimethyl-2,5-piperazinedione)
3-Methoxy-2-(1H)pyridone
Quinaldic acid
3,6-Dimethyl-pyrazine-2,5-dicarboxylic acid
Pyrazine-2,5-dicarboxylic acid
Pyrazinoic acid (2-carboxy pyrazine)

4-Hydroxy quinaldic acid
4-Methoxy quinaldic acid
Pyridine-2-carboxylic acid
Picolinic acid
2-Hydroxypyridine
Barbituric acid
8-Hydroxyquinoline
Cycloleucine
2,2'-Dipyridyl The non-aqueous solvent used to form the particles may be an organic ester, such as those known in the art for use as the liquid suspending medium of a light valve suspension, for example isopentyl acetate etc. It is presently preferred to use hexyl acetate as the non-aqueous solvent. Of course, the non-aqueous solvent must be capable of dissolving the polymeric stabilizer, whereas both the precursor compound and the light-polarizing material must be at least substantially insoluble in the non-aqueous solvent. An amount of the non-aqueous solvent will be used so that the reactants (i) and (ii) and the polymeric stabilizer are dissolved.

The halide moiety of reactant (ii) is usually iodine, but may be chloride and/or bromide.

As referred to above, a controlled amount of water must be present in the reaction medium in order for the reaction to proceed. In the absence of all water the reaction will not occur, but if there is an excess of water present then the particles will be too large, as described. To determine the controlled amount of water to be used, it is necessary to include in this calculation any water associated with any source, such as the reactants, the polymeric stabilizer and the non-aqueous solvent. For example any surface water carried by the precursor compound and any water of crystallization in the precursor compound must be included in this calculation.

Preferably, the reaction medium also comprises a small amount of methanol from about 5 to 50% by weight of the reactants (i), (ii) and (iii).

The polymeric stabilizer is used to prevent agglomeration of the particles. Polymeric stabilizers have long been used in the art of light valves to prevent agglomeration of the particles in a light valve suspension. It is presently preferred to use nitrocellulose as the polymeric stabilizer in the formation of the light-polarizing material, but other polymeric stabilizers known in the art of light valves may also be used.

The particles of the light-polarizing material are formed into a light valve suspension in a known manner by suspending the particles of the light-polarizing material in a liquid suspending medium, preferably in admixture with a polymeric stabilizer.

In general, the liquid suspending medium may comprise one or more electrically resistive, chemically inert liquids than will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pa. No. 4,247,175. In general one or both of the liquid suspending medium or the polymeric stabilizer dissolved therein is chosen so as to maintain the suspended particles in gravitational equilibrium.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Preferably, the liquid suspending medium also comprises a miscible electrically resistive organic liquid such as, for example, trialkyl trimellitate, etc. to provide gravitational equilibrium to the suspended particles and to assist in dispersing the particles in the liquid suspending medium. Other materials useful as the miscible electrically resistive organic liquid are those disclosed in U.S. Pat. No. 4,772,103, and details concerning the liquid suspending material may be found in U.S. Pat. No. 4,407,565.

Other types of suspensions which do not incorporate such halogenated liquids can also be used and can maintain the particles in gravitational equilibrium if a sufficient quantity of stabilizing polymer is employed therein.

Another useful light valve suspension is based on the use as the liquid suspending medium of organic liquids classified as plasticizers. Such "plasticizer" liquid suspending media may comprise one or more electrically resistive, chemically inert organic liquids that will suspend the particles and will dissolve the solid polymeric stabilizer. For example, where the solid polymeric stabilizer is solid poly(meth)acrylate, useful liquid suspending media include liquid plasticizers for poly(meth)acrylates, much as adipates, benzoates, glycerol triacetate, isophthalates, mellitates, oleates, chloroparaffins, phthalates, sebacates and the like. Liquid suspending media for other solid polymeric stabilizers may be similarly selected from liquids useful as plasticizers for such polymers. Preferably, trialkyltrimellitates, such as tri-n-propyl- or tri-n-butyl-trimellitate and/or dialkyl adipates, such as di-octyl adipate or di-2-ethylhexyl adipate, may be used as the liquid suspending medium for solid polymeric stabilizers based on copolymers of neopentyl-(meth)acrylate.

The polymeric stabilizer for the light valve suspension, when employed, can be a single type of polymer that bonds to the surface of the particles but also dissolves in the non-aqueous liquid or liquids of the liquid suspending medium. Alternatively, there may be two or more polymeric stabilizers serving as a polymeric stabilizer system. For example, the particles can be coated with a first type of polymeric stabilizer such as nitrocellulose, which in effect, provides a plain surface coating for the particles and one or more additional types of polymeric stabilizer that bond to or associate with the first type of polymeric stabilizer and also dissolve in the liquid suspending medium to provide dispersion and steric protection for the particles.

Preferably, to keep the particles in suspension, the liquid suspending medium may also comprise as the polymeric stabilizer an A–B type block polymer as disclosed in the U.S. patent application Ser. No. 855,266, filed Mar. 23, 1992, now U.S. Pat. No. 5,279,773, issued Jan. 18, 1994, which is incorporated herein by reference thereto, and in European Patent Publication 350,354. Nitrocellulose and/or other polymeric stabilizers may also be usefully provided in the liquid suspending medium in addition to the block polymer. It is preferred to use just enough A–B block polymer to maintain the particles in suspension, the amount to be used for a given light valve suspension being empirically determined, as is known. While the polymeric stabilizer is commonly a solid, such as a copolymer of neopentyl(meth)acrylate, and an unsaturated organic acid, the polymeric stabilizer may also be a liquid, such as a liquid copolymer of n-butyl acrylate and hydroxyethyl acrylate.

Usually, the amount of the polymeric stabilizer will be from about 1% to about 30%, such as from 5% to about 25% by weight, based on the total weight of the liquid light valve suspension. However, while the use of a polymeric stabilizer is preferred, it need not be used in all cases.

The liquid light valve suspension or light valve of the present invention may optionally also have therein other compatible materials, such as ultraviolet radiation absorbers, heat stabilizers and non-polymeric surfactants and dispersants, etc.

The liquid light valve suspension may be used as such as the light-modulating element of a light valve or it may be formed into a film which is then used as the light-modulating element of a light valve. See, for example the U.S. patents referred to above and pending U.S. patent applications Ser. Nos. 972,826 and 972,830, both filed Nov. 6, 1992 and both incorporated herein by reference thereto.

The present invention is illustrated in terms of a preferred embodiment in the following Examples.

EXAMPLE 1

The following ingredients were combined in order indicated:

40 g of ¼ sec SS nitrocellulose which was previously dried to constant weight at 55° C. was dissolved in 600 g of hexyl acetate (which contained an unknown amount of residual water) and to the resulting solution was then added 12g of the precursor compound, pyrazine-2,5-dicarboxylic acid dihydrate (which contained some surface water), 10.56 g of anhydrous calcium iodide, 18 g of elemental iodine and 3.5 g of anhydrous methanol. The mixture was then shaken for about 1 hour, during which the light polarizing particles were formed as a suspension in hexyl acrylate. The decay time of the resulting particles was 6 milliseconds using the Decay Time Test described above.

EXAMPLE 2

Example 1 above was repeated with the addition of 0.07 g of water. The decay time of the resulting particles was 9.5 milliseconds.

EXAMPLE 3

Example 1 was repeated with the addition of 0.10 g of water. The decay time of the resulting particles was 15 milliseconds.

EXAMPLE 4

The following ingredients were combined in the order indicated:

10g of ¼ sec SS nitrocellulose which was previously dried to constant weight at 55° C. was dissolved in 150 g of hexyl acetate (which was dried over a 132 molecular sieve to remove residual water) and to the resulting solution was then added 3 g of the precursor compound, pyrazine-2,5-dicarboxylic acid dihydrate (which contained some surface water), 2.64 g of anhydrous calcium iodide, 4.5 g of elemental iodine, 0.10 g of water and 3.5 g of anhydrous methanol. The mixture was then shaken for about 1 hour after which the light polarizing particles were formed as a suspension in hexyl acrylate. The decay time of the resulting particles was 6 milliseconds using the Decay Time Test described above.

EXAMPLE 5

Example 4 above was repeated with the addition of 0.20 g of water. The decay time of the resulting particles was 8 milliseconds.

EXAMPLE 6

Example 4 above was repeated with the addition of 0.23 g of water. The decay time of the resulting particles was 10 milliseconds.

EXAMPLE 7

Example 4 above was repeated with the addition of 0.30 g of water. The decay time of the resulting particles was 11 milliseconds.

EXAMPLE 8

Example 4 above was repeated with the addition of 0.35 g of water. The decay time of the resulting particles was 12 milliseconds.

EXAMPLE 9

Example 4 above was repeated with the addition of 0.5 g of water and 5 g of anhydrous methanol. The decay time of the resulting polarizers was 50 milliseconds and the particle size was unacceptably large.

As can be seen from the above examples, the decay time of the resulting particles (which is a function of the particle size) increases with the addition of more water. It should be noted that the surface water present in the precursor compound varies from lot to lot, but is usually in the range of 1 to 3 percent by weight of the weight of precursor compound. The amount of surface water present can be determined by drying a given amount of the precursor to constant weight and subtracting the calculated weight of water present as water of crystallization. The water of crystallization in the fully hydrated precursor compound is present in the ratio of two moles of water to one mole of precursor compound. The water of crystallization is loosely bound to the precursor and so it is not possible to drive off the surface water without also losing some, or all, of the waters of crystallization.

We claim:

1. A method of preparing particles of a light-polarizing material, which comprises reacting (i) elemental molecular iodine, (ii) a hydrohalide acid and/or an ammonium or alkali metal or alkaline earth metal halide, and (iii) a precursor compound selected from the group consisting of metal ion-chelating heterocyclic compounds containing a nitrogen atom in the heterocyclic ring, in the presence of a solution of a polymeric stabilizer in a non-aqueous solvent in which the precursor compound and the light-polarizing material are at least substantially insoluble, and in the presence of an amount of water effective to cause the formation of particles of said light-polarizing material but less than an amount which results in the formation of particles of said light polarizing material having an average particle length in excess of 1 micron.

2. The method according to claim 1, wherein the precursor compound is 2,5-dicarboxy pyrazine.

3. The method according to claim 1, wherein the reaction is carried out in the presence of methanol.

4. The method according to claim 1, wherein the non-aqueous solvent is isopentyl acetate.

5. The method according to claim 1, wherein said amount of water is in the range of from a trace amount to about 20% by weight, based on the weight of said reactants (i), (ii), and (iii).

* * * * *